United States Patent
Cho et al.

(10) Patent No.: US 10,598,564 B2
(45) Date of Patent: Mar. 24, 2020

(54) APPARATUS AND METHOD FOR DETECTING LEAKAGE IN HYDROGEN TANK OF HYDROGEN FUEL CELL VEHICLE

(71) Applicants: Hyundai Motor Company, Seoul (KR); Kia Motors Corporation, Seoul (KR)

(72) Inventors: Sung Mun Cho, Gyeonggi-do (KR); Kang Sik Jeon, Gyeonggi-Do (KR); Sae Hoon Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/275,637

(22) Filed: Feb. 14, 2019

(65) Prior Publication Data

US 2019/0178748 A1 Jun. 13, 2019

Related U.S. Application Data

(62) Division of application No. 15/187,119, filed on Jun. 20, 2016, now Pat. No. 10,209,158.

(30) Foreign Application Priority Data

Jul. 9, 2015 (KR) .................. 10-2015-0097525

(51) Int. Cl.
*G01M 3/32* (2006.01)
*G01M 3/26* (2006.01)
*G01M 3/28* (2006.01)

(52) U.S. Cl.
CPC ............ *G01M 3/3236* (2013.01); *G01M 3/26* (2013.01); *G01M 3/28* (2013.01); *G01M 3/2876* (2013.01); *G01M 3/3281* (2013.01)

(58) Field of Classification Search
CPC .................................................. G01M 3/3236
See application file for complete search history.

(56) References Cited

U.S. PATENT DOCUMENTS

| | | | | |
|---|---|---|---|---|
| 5,337,725 | A * | 8/1994 | Narita | F02M 26/57 123/568.16 |
| 9,554,456 | B2 * | 1/2017 | Hatazawa | H05K 1/0269 |
| 2004/0099048 | A1 * | 5/2004 | Miura | F23N 5/242 73/49.2 |
| 2005/0056081 | A1 * | 3/2005 | Gocho | G01M 3/2815 73/40 |

(Continued)

FOREIGN PATENT DOCUMENTS

| | | |
|---|---|---|
| JP | 2005-347198 A | 12/2005 |
| KR | 10-2003-0084311 A | 11/2003 |

(Continued)

*Primary Examiner* — Daniel S Larkin
*Assistant Examiner* — Anthony W Megna Fuentes
(74) *Attorney, Agent, or Firm* — Mintz Levin Cohn Ferris Glovsky and Popeo, P.C.; Peter F. Corless (57) ABSTRACT

An apparatus and a method for detecting leakage in a hydrogen tank of a hydrogen fuel cell vehicle are provided. Particularly, leakage is detected due to failure of an airtight seal of a solenoid valve in a hydrogen tank based on a change of the sensing value of a high pressure sensor which represents a hydrogen tank pressure during a process of performing a wakeup operation at the time of key-off of a vehicle.

7 Claims, 4 Drawing Sheets

(56) References Cited

U.S. PATENT DOCUMENTS

| | | |
|---|---|---|
| 2006/0180128 A1 | 8/2006 | Saito et al. |
| 2012/0015268 A1* | 1/2012 | Yoshida ............ H01M 8/04223 |
| | | 429/429 |
| 2012/0305430 A1* | 12/2012 | Jaeger ............... H01M 8/04201 |
| | | 206/459.1 |

FOREIGN PATENT DOCUMENTS

| | | |
|---|---|---|
| KR | 10-2006-0072707 A | 6/2006 |
| KR | 2006-0072665 A | 6/2006 |
| KR | 2008-0004967 A | 1/2008 |
| KR | 2008-0019257 A | 3/2008 |
| KR | 10-2012-0032759 A | 4/2012 |
| KR | 10-2012-0059802 A | 6/2012 |
| KR | 10-2012-0096218 A | 8/2012 |
| KR | 20140083739 A | 7/2014 |
| KR | 10-2014-0125620 A | 10/2014 |

\* cited by examiner

FIG. 1

RELATED ART

APPARATUS AND METHOD FOR DETECTING LEAKAGE IN HYDROGEN TANK OF HYDROGEN FUEL CELL VEHICLE

CROSS-REFERENCE TO RELATED APPLICATION

This application is a divisional of U.S. patent application Ser. No. 15/187,119, filed Jun. 20, 2016, which claims under 35 U.S.C. § 119(a) the benefit of priority to Korean Patent Application No. 10-2015-0097525, filed on Jul. 9, 2015, the entire contents of which are incorporated herein by reference.

BACKGROUND

(a) Technical Field

The present disclosure relates to an apparatus and a method for detecting leakage in a hydrogen tank of a hydrogen fuel cell vehicle, and more particularly, to an apparatus and a method for detecting leakage in a hydrogen tank of a hydrogen fuel cell vehicle which detect leakage due to airtightness failure of a solenoid valve in a hydrogen tank of a hydrogen fuel cell vehicle and determine a leakage degree.

(b) Background Art

In a hydrogen tank which is one of the core components in a hydrogen fuel cell vehicle, hydrogen leakage is directly connected to safety of a driver and pedestrians. In particular, purity of hydrogen in the hydrogen tank is high even when a minimal amount of hydrogen is ignited and thus, the hydrogen may be easily lit causing an explosion. External leakage is immediately determined and measured by a sound generated when the hydrogen gas leaks to the outside and detection of a hydrogen concentration sensor disposed within the vehicle. However, it may be difficult to determine leakage in the hydrogen tank and leakage which is generated in a hydrogen fuel supply line or a vehicle accident results in external leakage, which may cause a more substantial accident.

In particular, the external leakage refers to leakage in which hydrogen gas, which is a vehicle fuel, is exposed from a hydrogen fuel cell vehicle to the exterior to be discharged to the atmosphere and a cause of the leakage may be separation of or damage to a pipe such as a fuel supply line. The leakage in the hydrogen tank refers to internal leakage of the hydrogen tank due to failure of a solenoid valve which is connected to an inlet of the hydrogen tank and a cause of the leakage may be failure of airtight seal in the solenoid valve. Specifically, the leakage in the hydrogen tank refers to a situation in which the hydrogen fuel gas leaks due to the leakage (e.g., leakage caused by failure of airtight seal of the solenoid valve in the hydrogen tank) of the hydrogen tank but does not leak to the exterior since the hydrogen tank is connected to the fuel supply line.

Figure 1:
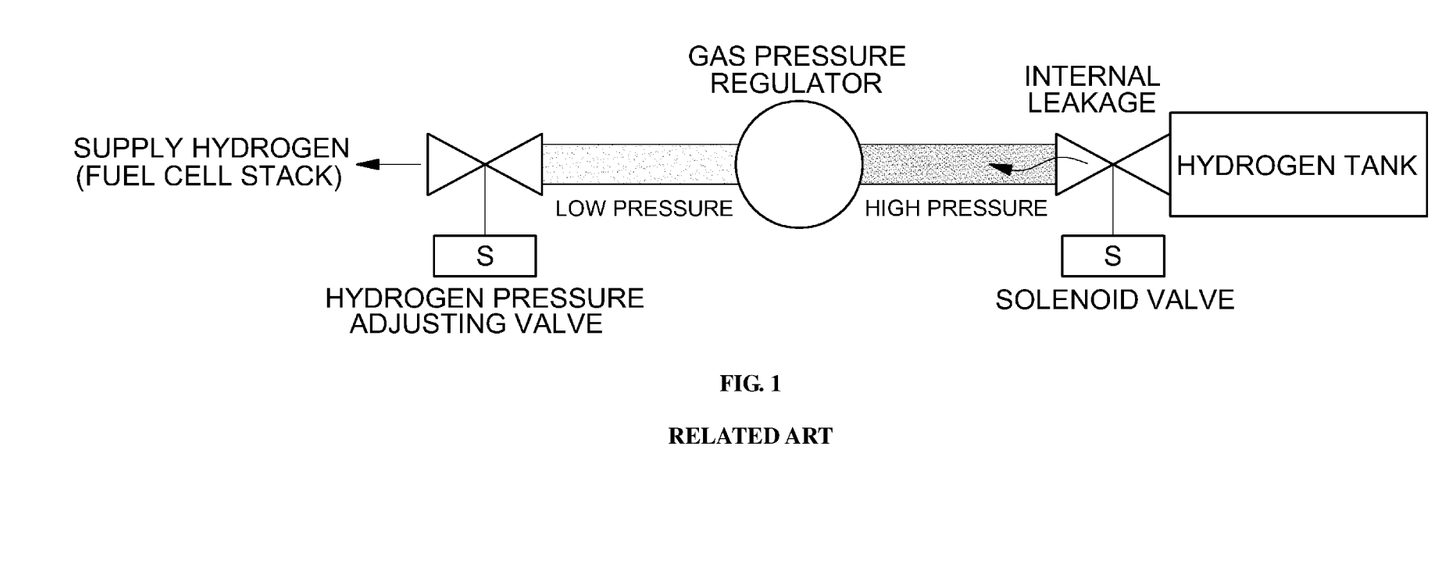
FIG. 1 is a schematic diagram illustrating a structure of a fuel supply pipe which is connected to a hydrogen tank of a general hydrogen fuel cell vehicle according to the related art.

In other words, referring to FIG. 1, the leakage in the hydrogen tank refers to a phenomenon in which a normal close type solenoid valve which is directly coupled to the inlet of the hydrogen tank does not completely block a flow passage between the hydrogen tank and the fuel supply pipe and thus, the hydrogen gas in the hydrogen tank leaks into the fuel supply pipe. When only the solenoid valve of the hydrogen tank has malfunctioned or failed, there is no safety problem with the vehicle but there may be a potential danger.

Therefore, a vehicle in which leakage is generated more than an allowed amount malfunctions and thus, a component requires replacement.

Further, in a state in which the leakage in the hydrogen tank is generated, when a minimal leakage is generated in a portion which is engaged with the hydrogen fuel supply line due to the car accident or a bad quality, the external leakage is continuously generated until a hydrogen tank pressure is completely exhausted. In other words, when the leakage in the hydrogen tank is generated, the hydrogen fuel gas is not exposed to the outside, but the leakage may act as a potential dangerous element, and thus it is necessary to detect the leakage in the hydrogen tank. When the external leakage is generated, the vehicle inspection may be completed in a state in which only the hydrogen fuel supply pipe is fixed but the leakage in the hydrogen tank is not fixed. Therefore, it is necessary to more accurately detect the leakage in the hydrogen tank.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for detecting leakage in a hydrogen tank of a hydrogen fuel cell vehicle, which detects leakage due to airtightness failure of a solenoid valve in a hydrogen tank based on a change of a sensing value (e.g., a hydrogen tank pressure) of a high pressure sensor which may represent a hydrogen tank pressure during a process of performing a wakeup operation in a key-off state of a vehicle and determines a leakage state and a leakage degree.

In one aspect, the present invention provides a method for detecting leakage in a hydrogen tank of a hydrogen fuel cell vehicle equipped with a fuel cell stack which is supplied with hydrogen gas stored in the hydrogen tank through a fuel supply line to generate electricity. The method may include detecting a hydrogen tank pressure $Pa1$ before performing primary wakeup after a predetermined time has elapsed after key-off of the vehicle; performing primary wakeup for injecting hydrogen gas which remains in the fuel supply line of the stack into the fuel cell stack using a pressure difference; and detecting the hydrogen tank pressure $Pb1$ after performing the primary wakeup to compare the hydrogen tank pressure $Pb1$ after performing the primary wakeup with a hydrogen tank pressure $Pa1$ before performing the primary wakeup to determine leakage in the hydrogen tank based a comparison result.

In addition, when the hydrogen tank pressures $Pa1$ and $Pb1$ before and after performing the primary wakeup are equal to each other, leakage in the hydrogen tank may be confirmed, and specifically, excessive leakage in the hydrogen tank may be confirmed due to failure of a solenoid valve configured to airtightly open and close an inlet of the hydrogen tank.

The method may further include: determining a difference between the hydrogen tank pressures $Pa1$ and $Pb1$ before and after performing the primary wakeup as a hydrogen tank pressure dropping amount $Pc1=Pa1-Pb1$ at the time of primary wakeup; detecting a hydrogen tank pressure $Pa2$ before performing secondary wakeup for injecting hydrogen gas which remains in the fuel supply line into the stack after the primary wakeup is performed and then a predetermined time has elapsed; and comparing the hydrogen tank pressure Pb1 after performing the primary wakeup and the hydrogen tank pressure Pa2 before performing the secondary wakeup to determine leakage in the hydrogen tank based on a comparison result, in which the hydrogen tank pressure Pb1 after performing the primary wakeup may be equal to a value obtained by subtracting the hydrogen tank pressure dropping value Pc1 at the time of the primary wakeup from the hydrogen tank pressure P0 which is confirmed and stored at the time of key-off of the vehicle.

Particularly, the hydrogen tank pressure Pb1 after performing the primary wakeup may be equal to a value P0−Pc1 obtained by subtracting a pressure dropping amount Pc1 from the hydrogen tank pressure P0 confirmed and stored at the time of key-off of the vehicle. Accordingly, the hydrogen tank pressure Pb1 after performing the primary wakeup and the hydrogen tank pressure Pa2 before performing the secondary wakeup may be compared and the leakage in the hydrogen tank may be determined based on the comparison result. Therefore, in the determination of the leakage in the hydrogen tank, when a condition Pb1<Pa2 is satisfied, leakage in the hydrogen tank may be confirmed and more particularly, when a condition Pb1<Pa2 is satisfied, it may be determined that a minimal leakage in the hydrogen tank is generated due to failure of a solenoid valve which airtightly opens/closes an inlet of the hydrogen tank.

In addition, the method may further include: confirming a hydrogen tank pressure Pa2 before performing secondary wakeup for injecting hydrogen gas which remains in the fuel supply line into the stack after the primary wakeup is performed and then a predetermined time has elapsed; and comparing a hydrogen tank pressure P0 confirmed and stored at the time of key-off of the vehicle and the hydrogen tank pressure Pa2 before performing the secondary wakeup to determine leakage in the hydrogen tank by a comparison result. In the determination of the leakage in the hydrogen tank, when a condition P0=Pa2 is satisfied, leakage in the hydrogen tank may be confirmed and more particularly, when a condition P0=Pa2 is satisfied, it may be determined that a minimal leakage in the hydrogen tank is generated due to failure of a solenoid valve which airtightly opens/closes an inlet of the hydrogen tank. Particularly, the hydrogen tank pressure may be a sensing value of a high pressure sensor mounted at a front end of the solenoid valve.

In another aspect, the present invention provides an apparatus for detecting leakage in a hydrogen tank of a hydrogen fuel cell vehicle which performs a wakeup function to inject hydrogen gas from a hydrogen fuel supply line to a fuel cell stack using a pressure difference when a vehicle stops. The apparatus may include a solenoid valve coupled to an inlet of the hydrogen tank that stores hydrogen gas to airtightly open/close the inlet; a high pressure sensor mounted at a front end of the solenoid valve to detect a pressure value which represents a hydrogen tank pressure; and a vehicle controller configured to determine leakage in the hydrogen tank due to failure of the solenoid valve based on the sensing value of the high pressure sensor which is detected before and after performing the wakeup function.

According to the present invention, whether there is leakage in a hydrogen tank may be determined more accurately and the leakage may be directly connected to safety of a hydrogen fuel cell vehicle and measurement thereof is performed, and thus, safety of the vehicle may be secured. The present invention is intended to determine leakage in the hydrogen tank and may be implemented by utilizing components which have been applied to the current vehicle instead of using additional hardware or an additional sensor unit.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Reference numerals set forth in the Drawings includes reference to the following elements as further discussed below.

10: hydrogen tank
12: solenoid valve
14: high pressure sensor
16: hydrogen supply valve
18: hydrogen pressure adjusting valve
20: vehicle controller It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Hereinafter, the present invention will be described to be easily carried out by those skilled in the art.

In the present invention, to detect leakage due to failure of airtight seal of a solenoid valve in a hydrogen tank and determine a leakage state and degree, in other words, to detect internal leakage of the hydrogen tank due to malfunction of a solenoid valve connected to an inlet of the hydrogen tank and determine a leakage state and degree, the leakage in the hydrogen tank may be detected and a leakage degree may be determined based on a pressure value detected using a hydrogen tank pressure sensor (or referred to as a high pressure sensor), which may represent a hydrogen tank pressure, and a pressure change.

In the hydrogen tank of the hydrogen fuel cell vehicle, to calculate a fuel amount in the hydrogen tank, generally, the high pressure sensor which may represent the hydrogen tank pressure is not directly mounted in the hydrogen tank, but may be mounted at a front end of a solenoid valve directly coupled to the inlet of the hydrogen tank. Particularly, a normal close type solenoid valve may be applied to function as an additional safety device to prevent the leakage of the hydrogen gas in the hydrogen tank even though there is external leakage on a fuel supply pipe when the vehicle stops and power is not applied, and that when the malfunctioning high pressure sensor is exchanged, the pressure sensor may be safely exchanged.

Moreover, when the fuel cell vehicle is parked or stopped for a substantial period of time, external air flows into a vehicle stack to form an oxide layer on an electrode layer catalyst in a fuel cell stack, which may decrease a performance of the stack. Further, when the vehicle starts in a state where the air is flowing into the stack, the hydrogen is supplied first in accordance with the starting process. In particular, the supplied hydrogen chemically reacts with the air which has been introduced from the outside and thus, high voltage is unintentionally instantly formed in the stack. This also disadvantageously affects the durability of a high voltage single element or the stack since high voltage as compared with a predetermined specification is formed. Accordingly, an air-cut valve (ACV) may be additionally mounted to prevent the air from flowing from the exterior. However, the ACV may merely delay a flowing speed of the external air and may not completely seal the stack, and thus, the air may be not prevented from flowing from the exterior.

As described above, since the air cannot be fundamentally prevented from flowing from the outside of the stack, as known in the related art, when the vehicle is parked for a substantial period of time, a wakeup operation of injecting hydrogen which remains in the hydrogen fuel supply line after a predetermined time has elapsed in a state in which the solenoid valve of the hydrogen tank is not opened into the stack using a pressure difference (e.g., a pressure difference between the stack and the fuel supply line) through a hydrogen supply valve (e.g., a valve configured to supply the hydrogen gas to the stack) and a hydrogen pressure adjusting valve (e.g., a valve configured to adjust a pressure of the hydrogen gas supplied to the stack) may be repeated twice. The hydrogen injected into the stack as described above reacts with oxygen in the air flowing from the outside as described above to remove the oxygen.

Accordingly, the oxide layer may be prevented from being formed on an electrode layer catalyst in the stack to prevent the performance of the stack from being deteriorated and also prevent the high voltage from being unintentionally formed when the hydrogen is supplied in accordance with the starting process when the vehicle starts thereafter. As a result, the hydrogen which remains in the existing fuel supply line may be used to improve the durability of the stack and prevent the high voltage compared to the specification from being formed when starting the vehicle. However, whenever the wakeup operation is performed, the pressure of the fuel supply line decreases and thus when the solenoid valve is opened to start the vehicle later, a loud noise may be generated. Further, internal airtightness of the solenoid valve may be damaged due to impact, and thus the wakeup operation may be allowed at most twice.

In the present invention, an algorithm for determining leakage in a hydrogen tank is added to an existing wakeup control logic while using existing hardware of the hydrogen fuel cell vehicle, thereby increasing safety of hydrogen of the hydrogen fuel cell vehicle. To secure durability of the solenoid valve and reduce noise when the solenoid valve is opened to try to start the vehicle later, the wakeup operation may be performed at most twice.

During a basic wakeup operation, a relatively low pressure may be formed in the stack and a high pressure hydrogen gas may be filled in the hydrogen fuel supply line even though the solenoid valve of the hydrogen tank is in an unopened state (e.g., closed state). Therefore, when the wakeup operation is performed, that is, when the hydrogen supply valve and the hydrogen pressure adjusting valve are opened to perform the wakeup operation, a sensing value of a high pressure sensor which represents a hydrogen tank pressure may show a pressure decrease of approximately P3 (see FIG. 2). The controller may be configured to detect whether leakage in the hydrogen tank is generated based on a degree of changed pressure during the decrease of the pressure, determine excessive leakage, minimal leakage, and a normal state (e.g., no leakage).

In particular, a hydrogen tank pressure behavior during the wakeup based on whether the leakage in the hydrogen tank is generated and a degree of leakage will be described with reference to FIG. 2. In response to determining that excessive leakage in the hydrogen tank is generated, after performing a wakeup operation at every predetermined time when a key-off of the vehicle is generated, that is, after opening the hydrogen supply valve and the hydrogen pressure adjusting valve to supply hydrogen gas which remains in the hydrogen fuel supply line to the stack after a predetermined time has elapsed when the key off of the vehicle is generated, sensing values of the high pressure sensor before and after the wakeup operation may be compared and in response to determining that there is no pressure difference, the controller may be configured to determine and confirm that excessive leakage in the hydrogen tank is generated.

Since the solenoid valve may be considered to be open when the leakage in the hydrogen tank is excessive due to malfunction of the solenoid valve, after the wakeup operation is performed and then a predetermined time passes (e.g., about two seconds) when the sensing value of the high pressure sensor shows a pressure decrease after the hydrogen supply valve and the hydrogen pressure adjusting valve are closed, the hydrogen gas stored in the hydrogen tank may leak to fill the hydrogen fuel supply line and thus the pressure drop may not occur.

Particularly, since the high pressure sensor which represents the hydrogen tank pressure may be mounted at a front end of the solenoid valve directly coupled to the inlet of the hydrogen tank to detect the hydrogen tank pressure, the sensing value of the high pressure sensor needs to show a pressure decrease as much as a hydrogen amount which is injected into the fuel cell stack from the hydrogen fuel supply line during wakeup operation. However, the hydrogen gas, which leaks from the hydrogen tank due to excessive leakage in the hydrogen tank for a short time after the wakeup operation, may fill the hydrogen fuel supply line and thus, the sensing value of the high pressure sensor may not show the pressure decrease.

Therefore, before and after the wakeup operation, the hydrogen tank pressure (e.g., the sensing value which represents the hydrogen tank pressure) may be detected at the front end of the solenoid valve using the high pressure sensor and when no difference is detected between the detected pressure values of the hydrogen tank before and after the wakeup operation, the controller may be configured to determine that the leakage in the hydrogen tank is generated due to the failure of the solenoid valve as much as the hydrogen amount which is injected into the stack.

Further, the high pressure sensor may not be directly mounted in the hydrogen tank, to thus cause the pressure decrease sensing phenomenon to be generated. When the high pressure sensor is directly mounted in the hydrogen tank and then the high pressure sensor is removed to be exchanged in a state in which high pressure hydrogen gas remains in the hydrogen tank, a substantial amount of high pressure hydrogen gas may leak to the outside and an operator may also be exposed to a dangerous environment. Therefore, the high pressure sensor may generally be mounted at the front end of the solenoid valve. Further, a normal close type solenoid valve may be applied, and thus, when the malfunctioning high pressure sensor is exchanged in a state in which when the vehicle stops and the power is not applied, the high pressure sensor may be safely exchanged.

Figure 2:
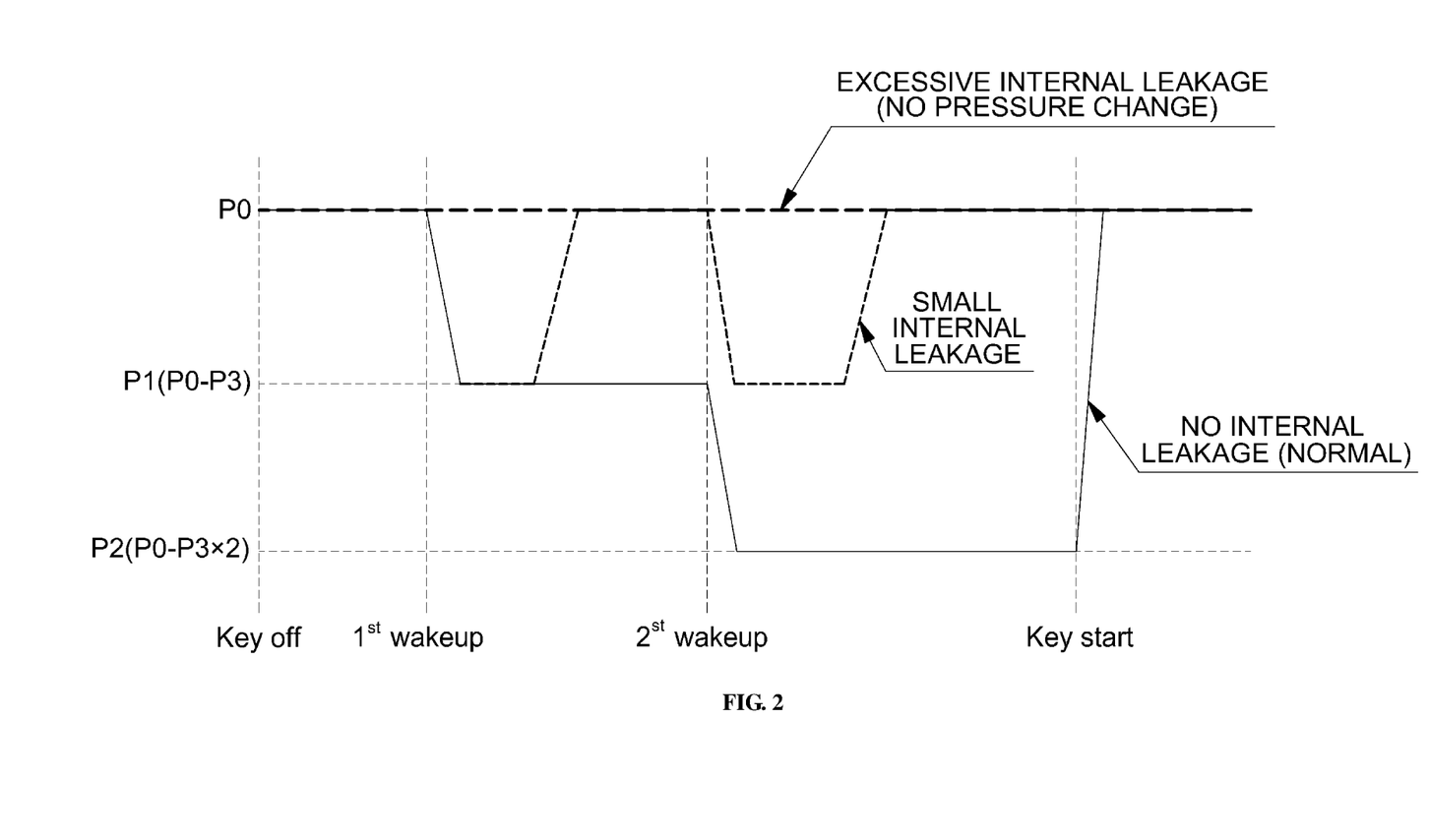
FIG. 2 is a view illustrating determination of leakage in a hydrogen tank and a hydrogen tank pressure behavior when wakeup is generated in accordance with a degree of leakage to describe a method for detecting leakage in a hydrogen tank of a hydrogen fuel cell vehicle according to an exemplary embodiment of the present invention.

As illustrated in FIG. 2, when the excessive leakage in the hydrogen tank is generated, the sensing value of the high pressure sensor which represents the hydrogen tank pressure may not be changed whenever the wakeup event is generated since the airtightness of the inlet of the hydrogen tank may not be maintained due to a failure of the solenoid valve in the inlet of the hydrogen tank. When a minimal leakage in the hydrogen tank is generated, the sensing value of the high pressure sensor during the wakeup event may be changed by P3. However, a hydrogen pressure which leaks from the hydrogen tank through the solenoid valve may be gradually filled in the fuel supply line while a predetermined time has elapsed before a next wakeup event, and thus, the sensing value of the high pressure sensor may be increased and maintained to a hydrogen tank pressure P0 at the time of key-off.

In particular, the sensing value of the high pressure sensor may be gradually increased due to the minimal leakage in the hydrogen tank, and thus, a hydrogen tank pressure P0 to P3, which is decreased by P3 due to primary wakeup, may be greater than a hydrogen tank pressure after the primary wakeup is performed and then a predetermined time passes or is increased to the hydrogen tank pressure P0 at the time of key-off. The excessive leakage in the hydrogen tank refers to a leakage state in which an internal leakage of the hydrogen tank due to the failure of the solenoid valve is significantly generated compared to the minimal leakage, and thus, the hydrogen pressure which decreases in the fuel supply line may be filled whenever the wakeup is generated. The solenoid valve may be in a state in which the airtightness state is insufficient and at the solenoid valve may be considered to be in an open state due to the reduce airtight seal.

Further, the minimal leakage in the hydrogen tank refers to a leakage state in which the internal leakage of the hydrogen tank due to the failure of the solenoid valve is minimal compared to the excessive leakage, and thus the hydrogen tank pressure which decreases at the time of the primary wakeup may be fillable to be a predetermined amount or more before secondary wakeup. Additionally, in the normal state in which no leakage in the hydrogen tank is generated, a predetermined amount P3 of pressure may decrease as much as the hydrogen amount which is injected from the fuel supply line into the stack when the wakeup event occurs and thus, the sensing value of the high pressure sensor may be reduced. The airtightness of the inlet of the hydrogen tank may be maintained by the solenoid valve in the normal state and thus, the hydrogen tank pressure which decreases during wakeup event may be satisfactorily maintained.

Moreover, the apparatus for detecting leakage in a hydrogen tank of a hydrogen fuel cell vehicle according to the present invention may be configured as described below and the configuration may be implemented by utilizing hardware which is already applied to the hydrogen fuel cell vehicle of the related art as it is.

Figure 3:
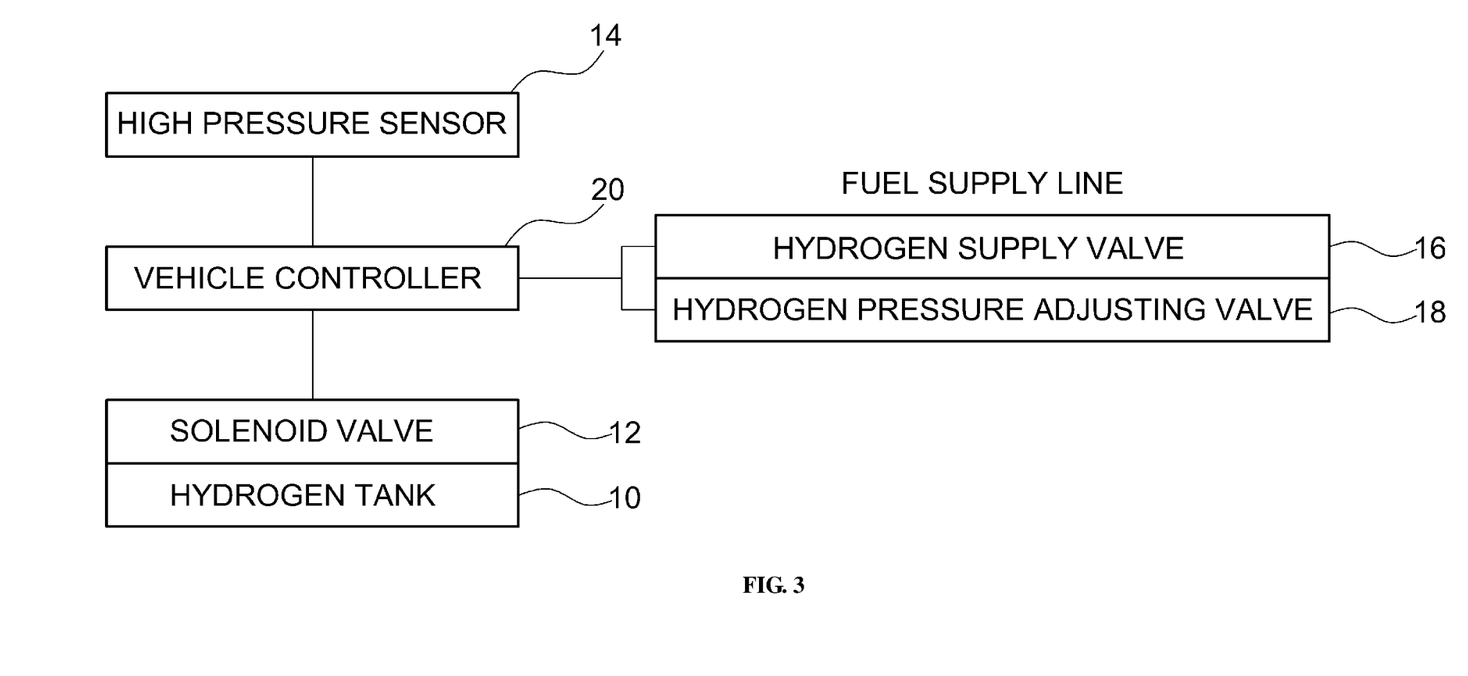
FIG. 3 is a view illustrating an apparatus for detecting leakage in a hydrogen tank of a hydrogen fuel cell vehicle according to an exemplary embodiment of the present invention.

As illustrated in FIG. 3, in a hydrogen fuel cell vehicle which performs a wakeup function to inject hydrogen gas from a hydrogen fuel supply line to a fuel cell stack using a pressure difference when a vehicle stops, an apparatus configured to detect leakage in a hydrogen tank of the hydrogen fuel cell vehicle may include a solenoid valve 12 coupled to an inlet of a hydrogen tank 10 configured to store the hydrogen gas to open/close the inlet, a high pressure sensor 14 mounted at a front end of the solenoid valve 12 to detect a pressure value which represents pressure of hydrogen tank 10, and a vehicle controller 20 configured to determine leakage in the hydrogen tank due to failure/ malfunction of the solenoid valve 12 based on a sensing value of the high pressure sensor 14 detected before and after performing the wakeup function. The various components of the apparatus may be operated by the vehicle controller 20.

The apparatus may further include a hydrogen supply valve 16 mounted on the fuel supply line to supply hydrogen to a fuel cell stack and may be configured to supply the hydrogen to the stack to perform the wakeup function at the time of key-off of the vehicle and a hydrogen pressure adjusting valve 18 mounted on the fuel supply line to adjust a pressure of the hydrogen supplied to the fuel cell stack and may be configured to adjust a pressure of the hydrogen gas supplied to the stack to perform the wakeup function at the time of key-off of the vehicle.

Figure 4:
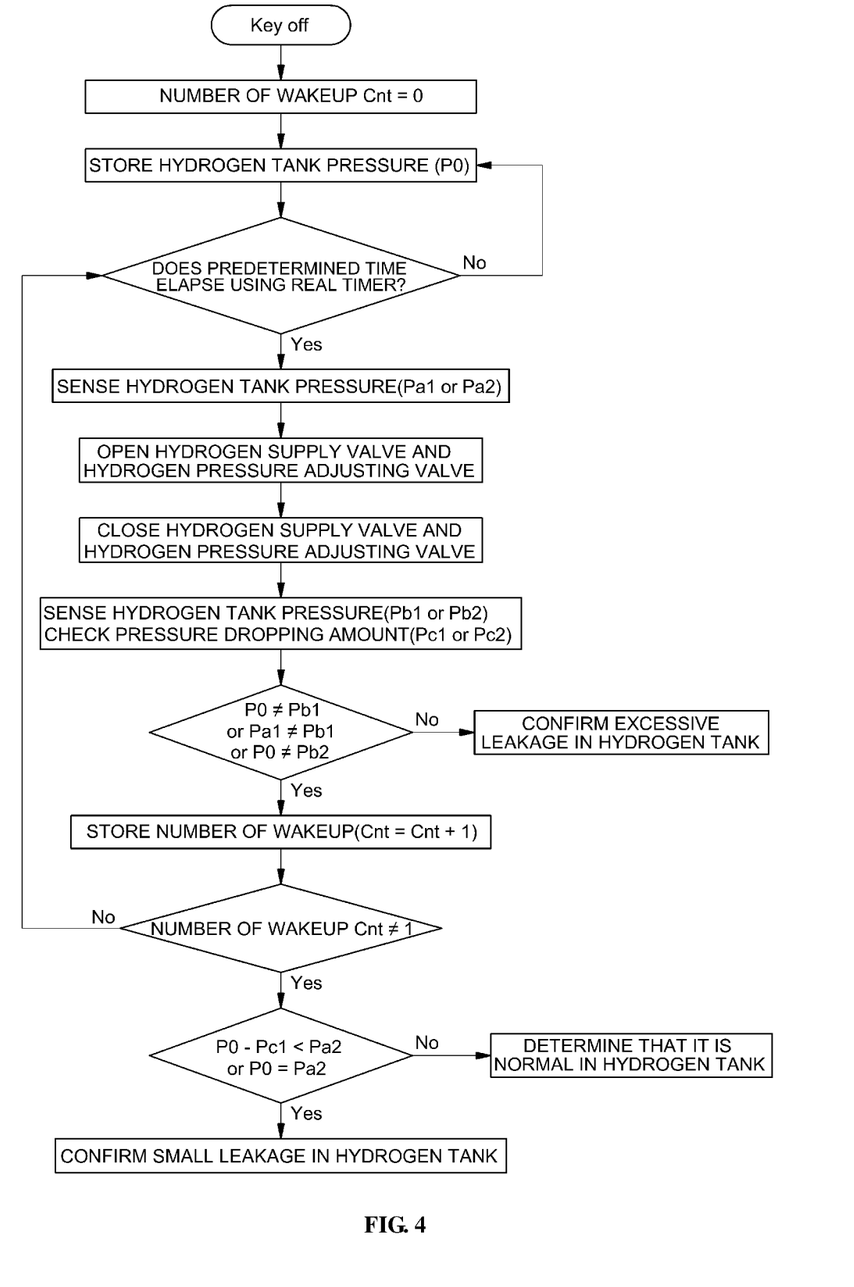
FIG. 4 is a flowchart illustrating a method for detecting leakage in a hydrogen tank of a hydrogen fuel cell vehicle according to an exemplary embodiment of the present invention.

Hereinafter, a method for detecting leakage in a hydrogen tank of the present invention will be described with reference to FIG. 4. As mentioned above, it is noted that the hydrogen tank pressure is a value representing a hydrogen tank pressure and also has the same meaning as the sensing value of the high pressure sensor mounted at the end stage of the solenoid valve.

First, in the present invention, a hydrogen tank pressure P0 at the time of key-off of the vehicle, that is, the sensing value of the high pressure sensor 14 may be stored in a memory of the vehicle controller 20. When a predetermined time (e.g., a period of time required when primary wakeup occurs after the key-off) after the key-off has elapsed using a real timer in the vehicle controller 20, configured to execute the wakeup operation, a hydrogen tank pressure Pa1 may be sensed and confirmed.

Additionally, a hydrogen pressure adjusting valve 18 and a hydrogen supply valve 16 mounted in a fuel supply line of a stack may be opened for a predetermined period of time to primarily perform wakeup and the hydrogen pressure adjusting valve 18 and the hydrogen supply valve 16 may be closed to complete the primary wakeup, and then a hydrogen tank pressure Pb1 may be sensed and confirmed. In particular, a decrease amount (Pc1=Pa1−Pb1) of the hydrogen tank pressure that corresponds to an amount of hydrogen injected into the stack at the time of wakeup may be calculated and confirmed.

When the hydrogen tank pressure Pa1 before the primary wakeup operation and the hydrogen tank pressure Pb1 after the primary wakeup operation are compared and a condition Pa1=Pb1 that the hydrogen tank pressure Pa1 before the primary wakeup operation is equal to the hydrogen tank pressure Pb1 after the primary wakeup operation is satisfied, that the controller may be configured to determine that an excessive leakage in the hydrogen tank is generated. Further, when the condition Pa1=Pb1 that the hydrogen tank pressure Pa1 before the primary wakeup operation is equal to the hydrogen tank pressure Pb1 after the primary wakeup operation is not satisfied, whether the predetermined period of time (e.g., which is determined by a time difference between the primary wakeup and the secondary wakeup) after the primary wakeup has elapsed may be confirmed using the real timer.

In response to determining that the predetermined period of time after completing the primary wakeup has elapsed, the pressure Pa2 of the hydrogen tank may be sensed and confirmed again. Particularly, the hydrogen tank pressure Pb1 after performing the primary wakeup may be equal to a value obtained by subtracting a dropped hydrogen tank pressure Pc1 at the time of the primary wakeup from the hydrogen tank pressure P0 confirmed and stored at the time of key-off of the vehicle. Thus, the hydrogen tank pressure Pb1 after performing the primary wakeup and the hydrogen tank pressure Pa2 before performing the secondary wakeup may be compared and the leakage in the hydrogen tank may be determined based on the comparison result.

Further, similarly to the primary wakeup, the hydrogen pressure adjusting valve 18 and the hydrogen supply valve 16 may be opened to perform secondary wakeup and the two valves may be closed to complete the wakeup. Thereafter, the hydrogen tank pressure Pb2 may be sensed and confirmed by the high pressure sensor 14 after the wakeup operation and the dropped pressure amount Pc2=Pa2−Pb2 of the hydrogen tank in accordance with the secondary wakeup may be calculated and confirmed.

When the hydrogen tank pressure P0 at the time of key-off of the vehicle and the hydrogen tank pressure Pb2 after the secondary wakeup operation are compared and a condition P0=Pb2 that the hydrogen tank pressure P0 at the time of key-off of the vehicle is equal to the hydrogen tank pressure Pb2 after the secondary wakeup operation is satisfied, the controller may be configured to determine that an excessive leakage in the hydrogen tank is generated. Further, when the condition P0=Pb2 that the hydrogen tank pressure P0 at the time of key-off of the vehicle is equal to the hydrogen tank pressure Pb2 after the secondary wakeup operation is not satisfied, the controller may be configured to confirm that no excessive leakage in the hydrogen tank is generated.

To determine whether a minimal leakage in the hydrogen tank occurs, a value P0−Pc1 obtained by subtracting the pressure dropping amount (Pc1=Pa1−Pb1) which decreases at the time of the primary wakeup from the hydrogen tank pressure P0 at the time of key-off may be compared with the hydrogen tank pressure Pa2 before performing the secondary wakeup after a predetermined period of time has elapsed since the primary wakeup is completed. When a condition P0−Pc1<Pa2 or Pb<Pa2 that the value P0−Pc1 is less than the hydrogen tank pressure Pa2 before performing the secondary wakeup or a condition P0=Pa2 that the hydrogen tank pressure P0 at the time of key-off is equal to the hydrogen tank pressure Pa2 before performing the secondary wakeup is satisfied, the controller may be configured to determine that the minimal leakage in the hydrogen tank occurs. When the two conditions are not satisfied, the controller may be configured to determine a normal state in which no leakage in the hydrogen tank is generated.

When the condition P0−Pc1<Pa2 is satisfied, the controller may be configured to determine that the hydrogen gas is gradually filled in the fuel supply line due to the minimal leakage in the hydrogen tank and thus, the hydrogen tank pressure Pa2 before performing the secondary wakeup after a predetermined time has elapsed since the primary wakeup is completed may be greater than the hydrogen tank pressure P0−Pc1 which decreases by the primary wakeup. When the condition P0=Pa2 is satisfied, the controller may be configured to determine that the hydrogen fuel supply line is gradually filled to reach the hydrogen tank pressure P0 before performing the primary wakeup due to the minimal leakage generated in the hydrogen tank.

When the leakage in the hydrogen tank is determined as described above, a warning light of a cluster may be turned on to warn the driver of the leakage. The present invention is, however, not limited thereto and another type of warning may be provided to the driver. For example, the warning may be a sound output by the controller. According to the method for detecting leakage in the hydrogen tank according to the present invention, without performing an additional control or operation to detect and determine the leakage in the hydrogen tank, the leakage in the hydrogen tank may be determined by dividing a degree (excessive/minimal) thereof using a result of monitoring the hydrogen tank pressure by the high pressure sensor during the process of performing the wakeup as in the related art.

According to the present invention, separate from detection of a hydrogen leakage concentration sensor and detection of the external leakage using a leakage sound of the hydrogen gas in the related art, the leakage in the hydrogen tank may be detected based on the change of the hydrogen tank pressure. Thus, even when the leakage in the hydrogen tank is generated together with the external leakage of the hydrogen fuel cell vehicle, the leakage in the hydrogen tank may be fixed. Further, when the external leakage is not generated, whether the leakage in the hydrogen tank is generated may be determined and a warning light of a cluster may be turned on to notify the driver of the leakage, and thus, a preliminary action may be taken, thereby maintaining and securing the safety of the hydrogen fuel cell vehicle.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An apparatus for detecting leakage in a hydrogen tank of a hydrogen fuel cell vehicle which performs a wakeup function to inject hydrogen gas from a hydrogen fuel supply line to a fuel cell stack using a pressure difference when a vehicle stops, the apparatus comprising:
    a solenoid valve coupled to an inlet of the hydrogen tank that stores hydrogen gas to airtightly open and close the inlet;
    a pressure sensor mounted at a front end of the solenoid valve to detect a pressure value which represents a hydrogen tank pressure; and
    a vehicle controller configured to determine a leakage generation in the hydrogen tank due to failure of the solenoid valve based on a pressure sensing value of the pressure sensor detected before performing the wakeup function and a pressure sensing value of the pressure sensor detected after performing the wakeup function, wherein a degree of leakage includes an excessive leakage, a minimal leakage, and no leakage.

2. The apparatus of claim 1, wherein the minimal leakage in the hydrogen tank refers to a leakage state in which an internal leakage of the hydrogen tank due to the failure of the solenoid valve is less than the excessive leakage.

3. The apparatus of claim 1, wherein the minimal leakage in the hydrogen tank refers to a leakage state in which the internal leakage of the hydrogen tank due to the failure of the solenoid valve is less than the excessive leakage.

4. The apparatus of claim 1, wherein the vehicle controller is configured to compare a pressure sensing value $Pb1$ of the pressure sensor detected after performing a primary wakeup and a pressure sensing value $Pa2$ of the pressure sensor before performing a secondary wakeup and when the pressure sensing value $Pb1$ of the pressure sensor detected after performing the primary wakeup is less than pressure sensing value $Pa2$ of the pressure sensor detected before performing the secondary wakeup, determine the minimal leakage generation in the hydrogen tank.

5. The apparatus of claim 1, wherein the vehicle controller is configured to compare a pressure sensing value $P0$ confirmed and stored at a time of key-off of the vehicle and a pressure sensing value $Pa2$ of the pressure sensor detected before performing a secondary wakeup and when the pressure sensing values $P0$ and $Pa2$ are equal to each other, determine the minimal leakage generation in the hydrogen tank.

6. The apparatus of claim 1, wherein the vehicle controller is configured to compare a pressure sensing value $P0$ confirmed and stored at a time of key-off of the vehicle and a pressure sensing value $Pb2$ of the pressure sensor detected after performing a secondary wakeup and when the pressure sensing values $P0$ and $Pb2$ are equal to each other, determine the excessive leakage generation in the hydrogen tank.

7. The apparatus of claim 1, wherein the solenoid valve is a normal close type solenoid valve.

* * * * *